United States Patent Office 3,480,156
Patented Nov. 25, 1969

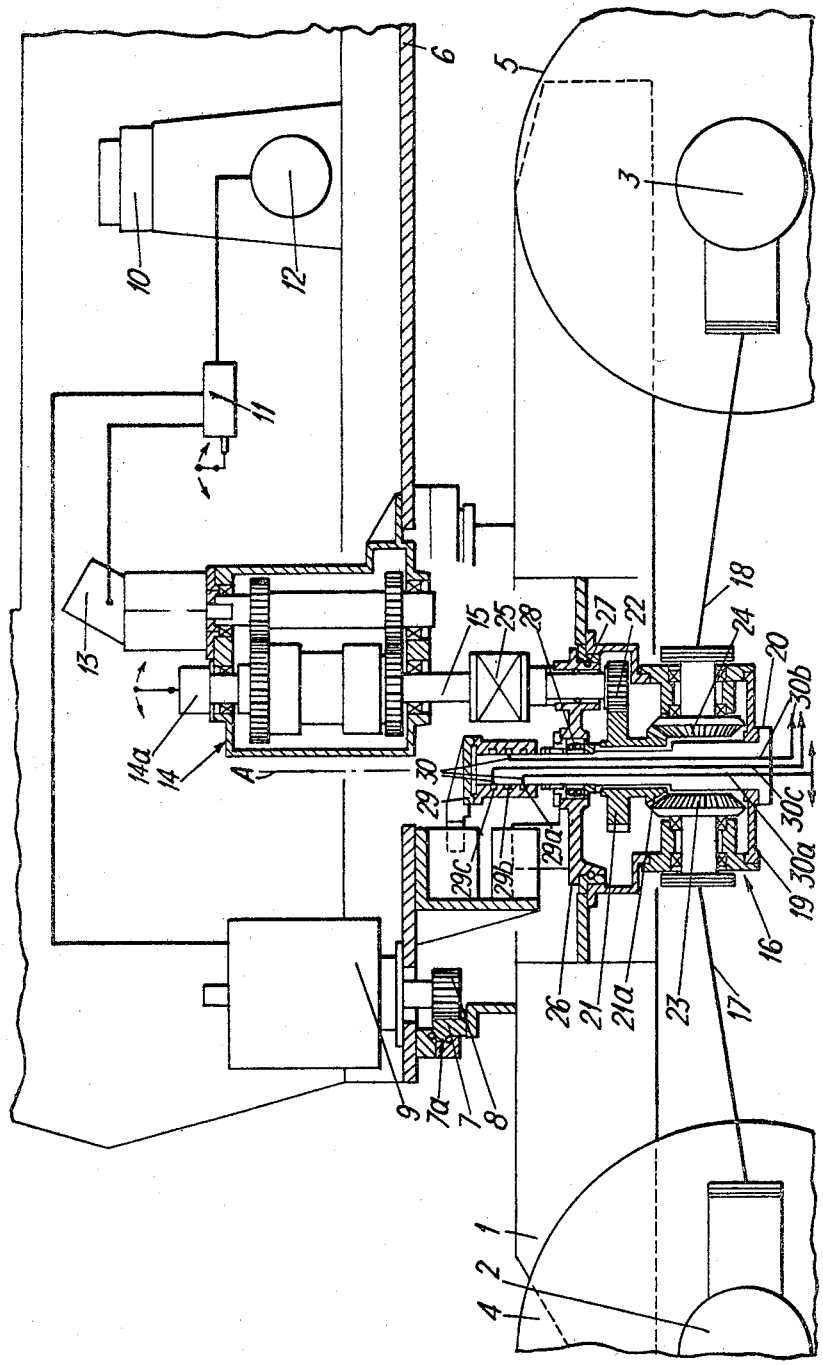

3,480,156
SELF-PROPELLED VEHICLE WITH ROTATABLE SUPERSTRUCTURE
Pietro Pensa, Milan, Italy, assignor to Massey-Ferguson Services N.V., Curacao, Netherlands Antilles, a corporation of Netherlands Antilles
Filed Jan. 5, 1968, Ser. No. 695,935
Claims priority, application Italy, Jan. 19, 1967,
A 11,691/67
Int. Cl. B66c 23/40, 23/54
U.S. Cl. 212—38           4 Claims

ABSTRACT OF THE DISCLOSURE

A self-propelled excavator having a driven wheel mounted chassis, with rotatable superstructure having an engine connected to drive by suitable means such as a hydraulic transmission, a change speed gear in turn having an output shaft having a gear thereon meshing with a gear forming the input to a distribution gearing carried on the chassis and connected to the wheels, the input gear for the distribution gearing being on an axis coincident with the axis of rotation of the superstructure on the chassis. A fluid pressure transfer means is also arranged on this axis of rotation. An interlock means prevents simultaneous rotation of the superstructure and drive of the wheels.

---

Self-propelled material handling equipment such as excavators have shown a trend toward transmission of power by means of hydrostatic pumps and motors. Transmission of power by this means enables the power to be delivered at points remote from the engine without undue mechanical complication. A pump or pumps for pressurizing the hydrostatic system or systems are usually close to the engine in the rotating superstructure but the motors are usually remote therefrom and close to the point where power is required, e.g., wheel motors in the case where the ground wheels or tracks are hydraulically driven, hydraulic steering servo-mechanism and the power brake servo-mechanism.

At the present time, other than truck mounted units, there are two main types of self-propelled excavators, viz; the wheeled and track types with still another form known as a "walking" type. These latter are usually larger but could incorporate the present invention. In the wheel type self propelled excavator the propulsion hydraulic motor can be located either in the rotatable superstructure or in the lower frame or chassis which supports the axles. Generally speaking, the motion is transmitted through a mechanical gearbox or transmission incorporating at least one forward and one reverse gear ratio.

When the gearbox and propulsion motor are mounted in the rotatable superstructure the drive connection with the engine is relatively easily effected but the drive connection with the wheels is rendered difficult because of the rotatability of the superstructure relative to the chassis. the controls are also placed in the rotating superstructure and it is easier to connect the controls when the gearbox is in the superstructure.

A preferred embodiment of the invention will now be described with reference to the accompanying drawing which shows in diagrammatic form a section through a four-wheel drive excavator having a 360° rotating superstructure.

A chassis 1 supports axles 2 and 3 with which are associated driving wheels 4 and 5 respectively. Superstructure 6 is mounted for rotary movement on thrust bearings 7a on an annular ring gear 7, the teeth of the gear being presented radially inwardly and being in mesh with a pinion 8 driven by a hydraulic motor 9 which is secured to the superstructure 6. An internal combustion engine 10 is mounted on superstructure 6 and drives a hydraulic pump 12 which delivers oil under pressure to a switch valve 11 and from there either to the control motor 9 or to an alternative hydraulic motor 13 for the purpose of providing a ground drive.

Motor 13 is mounted on a power shift gearbox or transmission 14 which is secured to the superstructure 6. The output shaft 15 of the gearbox 14 extends vertically downwardly. The gearbox 14 can be provided with one or more ratios in both forward and reverse directions and these can be engaged by means of hydraulic clutches. A valve 14a which controls the engagement of the clutches has an interlock whereby the clutches cannot be engaged when the superstructure 6 is in movement or is in a condition where it is immediately capable of movement, i.e. is temporarily at a standstill. A distribution gearbox 16 is secured to the chassis 1 and has two outputs which connect through universally jointed shafts 17 and 18 with the axles 2 and 3 respectively. A vertical member in the form of a shaft 20 is fixed to the casing 19 of the distribution gearbox 16 and is therefore not rotatable. The axis of shaft 20 coincides with the axis A, defined by the center of the bearings 7a, the axis A defining the axis of rotation of the superstructure. A gearwheel 21 encircles the vertical shaft 20 and is driven by a pinion 22 meshing externally with it. A bevel gear 21a is unitary with the gear 21 and drives bevel gears 23 and 24 which in turn drive the respective universally jointed shafts 17 and 18.

Gear pinion 22 is driven, through a joint 25, by the vertical shaft 15 which constitutes the output of the shift-gearbox 14. Gear pinion 22 is also supported by a cover member 26 which can rotate on the upper part of casing 19 in unison with movement of the superstructure, on the ball race 27 and on the bearing 28 around the axis A. When the superstructure rotates, the hydraulic clutches of the power shift gearbox are free due to their interlock and the cover member 26 is rotated with the superstructure while the pinion 22 rotates freely by engaging idly with gear 21 which is stationary.

When a drive connection is made inside the power shift gearbox by operation of valve 14a, and high pressure oil is directed to hydraulic motor 13 by operation of switch valve 11, pinion 22 is put into motion and drives the transmission contained in distribution gearbox 16 and consequently the universally jointed shafts 17 and 18 and axles 2 and 3 with the result that the excavator is propelled along the ground. When this happens the superstructure is not in motion and indeed cannot move because no oil under pressure is supplied to motor 9 and no oil can leave motor 9. The motor 9 in these circumstances constitutes a hydraulic brake or lock on the movement of the superstructure.

A collector member or fluid transmitting union 29 rotatable with the superstructure engages the upper end of shaft 20 in fluid sealing relation. Three internal galleries 29a, b and c are disposed opposite the upper openings of three passages 30a, b and c formed in the vertical shaft 20. The galleries 29a, b and c are connected at the exterior of the union member 29 to control members which permit oil under pressure to flow into the galleries and down through the channels 30a, b and c. In the present embodiment, three channels are illustrated, one, 30a, for the hydraulic brakes of the vehicle and the other two, 30b, 30c, to supply the opposite ends of a double acting power steering actuator. Several other passages could be provided in shaft 20 and these could conveniently go to any other hydraulic power actuators. Suitable interlocking arrangements would be provided in the superstructure to ensure that if stabilizer feet are provided, they could not be retracted while the superstructure was in motion.

It will be clear that it is not necessary for shaft 20 to be a solid shaft. It would probably be more convenient for shaft 20 to be a hollow shaft and to receive an insert having grooves formed on the exterior surface thereof to fit closely within a large bore in the shaft 20. The grooves would then, with suitable drillings through the walls of shaft 20, constitute the channels 30a, b, c, etc. Further, the driving joint 25 may advantageously be of a type which will accommodate a certain amount of misalignment between shaft 15 and pinion 22.

The embodiment therefore provides a relatively simple and consequently cheap method of providing hydraulic services to chassis or wheel mounted hydraulic actuators.

I claim:
1. A self-propelled material handling machine comprising a chassis, ground engaging means mounted on the chassis for propelling the chassis, a superstructure, means mounting the superstructure on the chassis for rotation about an axis, power transmission means operatively connected to said ground engaging means mounted on the chassis and including a vertical input shaft concentric with the axis, an engine mounted on the superstructure, a change speed transmission mounted on the superstructure and including a vertical output shaft located eccentrically of the axis, gear means on both shafts for transmitting power therebetween, power means for rotating the superstructure about the axis, power distribution means operatively interconnecting the engine and the change speed transmission and operatively interconnecting the engine and the power means, and control means for the power distribution means operable to prevent simultaneous rotation of the superstructure and propelling of the chassis.

2. The machine of claim 1 wherein a fluid transmitting means having a first member fixed to said superstructure and a second member fixed to said chassis is provided to transfer fluid under pressure between said superstructure and chassis, said members being arranged on said vertical axis.

3. The machine of claim 2 wherein the members of the fluid transmitting means include a plurality of passages for conducting a plurality of isolated fluid pressures between the superstructure and chassis.

4. The machine of claim 1 wherein the power means include a fluid motor, the change speed transmission includes a second fluid motor, the power distribution means include a fluid pump driven by the engine and a fluid circuit connecting the pump with each motor, and the control means include a valve for alternately directing pressure fluid from the fluid pump to one of the fluid motors.

References Cited
UNITED STATES PATENTS

| | | | |
|---|---|---|---|
| 2,254,192 | 8/1941 | White | 180—6.58 |
| 2,266,651 | 12/1941 | McLean | 212—38 |
| 2,604,175 | 7/1952 | Burdick et al. | 180—6.58 |
| 2,949,162 | 8/1960 | Davis | 212—38 X |

A. HARRY LEVY, Primary Examiner

U.S. Cl. X.R.
180—49